(12) United States Patent
Clausen et al.

(10) Patent No.: US 6,775,415 B1
(45) Date of Patent: Aug. 10, 2004

(54) FRACTAL IMAGE COMPRESSION USING REINFORCEMENT LEARNING

(75) Inventors: Clifford Clausen, Springfield, VA (US); Harry Wechsler, Fairfax, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/577,949

(22) Filed: May 25, 2000

Related U.S. Application Data

(60) Provisional application No. 60/135,992, filed on May 25, 1999.

(51) Int. Cl.[7] ................................................ G06K 9/36
(52) U.S. Cl. ...................... 382/249; 382/239; 382/240
(58) Field of Search ............................... 382/249, 233, 382/232, 248, 235, 166, 240, 239

(56) References Cited

U.S. PATENT DOCUMENTS

| | | | | |
|---|---|---|---|---|
| 5,347,600 A | * | 9/1994 | Barnsley et al. | 382/249 |
| 5,867,603 A | * | 2/1999 | Barnsley et al. | 382/249 |
| 5,923,376 A | * | 7/1999 | Pullen et al. | 375/240.16 |
| 5,982,441 A | * | 11/1999 | Hurd et al. | 348/417.1 |
| 6,002,794 A | * | 12/1999 | Bonneau et al. | 382/166 |

OTHER PUBLICATIONS

"Fractal Image Compression Using Quad–Q–Learning," Ph.D. dissertation, George Mason University, Nov. 13, 1998, pag 122–178.*

"Lean domain pools for fractal image compression," D. Saupe, Journal of Electronic Imaging, 8(1), Jan., 1999, pp. 99–103.*

"A quadtree classified–based fractal image coding approach," Wang et al., Fifth Asia–Pacific Conference on Communication an Fourth Optoelectronics and Communications Conference, vol. 2, Oct. 18–22, 1999, pp. 912–915.*

\* cited by examiner

*Primary Examiner*—Wenpeng Chen
(74) *Attorney, Agent, or Firm*—David G. Grossman; Richard Lebovitz

(57) ABSTRACT

A method for fractal image compression using reinforced learning is disclosed. The reinforced learning algorithm improves the performance of fractal image compression algorithms by improving image partitioning and transform family selection while considering the impact of domain to range matching. The present invention differs from other fractal image compression algorithms in that it makes decisions about transform family and image partitioning by generalizing from experience compressing small portions of an image to compressing an image as a whole.

18 Claims, 11 Drawing Sheets

FRACTAL IMAGE COMPRESSION USING REINFORCEMENT LEARNING

The present application claims the benefit of provisional patent application Serial No. 60/135,992 to Clausen et al., filed on May 25, 1999, entitled "Fractal Image Compression using Quad-Q-Learning, which is hereby incorporated by reference.

FIELD OF THE INVENTION

This invention generally relates to the field of image compression. More specifically, the present invention relates to fractal image compression using a reinforcement learning algorithm.

BACKGROUND OF THE INVENTION

Images can occupy a vast amount of storage space when represented in digital form. However, representing images and other information digitally has many advantages including robustness. Digital representation of information may be stored and recovered, transmitted and received, processed and manipulated, all virtually without error. Communications are converting to digital at an impressive rate. Telephone transmissions, fax transmissions, and multimedia content are mostly communicated in digital form. Digital content integrated with computers, telecommunications networks, and consumer products are now fueling the information revolution.

Because of the potential size of digital content, there has developed a need for digital compression. As a result compression has become an important area of interest. Compression may reduce disk capacity requirements for storage of digital content, and may improve transmission time for digital content in bandwidth limited applications such as web pages.

Communications channels such as the public switched telephone networks, coaxial cable networks, cellular networks, and satellite networks have a limited bitrate available. A technique to increase transmission speed is to reduce the average number of bits being transmitted, that is, to compress the digital data. To become viable, many low bitrate applications such as image retrieval on the World Wide Web require compression.

Many compression algorithms of varying complexity, quality, robustness and efficiency have been developed including fractal image compression. Fractal image compression exploits self-similarity which exists in natural images to achieve compression. Fractal image compression may require that images be partitioned into sub regions, called ranges that may each be represented as transformed copies of other sub regions called domains. Domains are typically overlapping regions and transformations are usually contractive. A domain pool is a set of domains. A search may be performed among the domains in a domain pool and among a set of function families that map image domains to image ranges to find a domain/function pair that closely matches each range within the current partition of the image. This search may be computationally expensive and as a consequence, practical fractal image compression may require that the search be constrained. What is needed is a way of improving the efficiency of fractal compression that addresses the following aspects of the compression process: image partitioning; transform family selection; and domain to range matching.

SUMMARY AND ADVANTAGES OF THE INVENTION

One advantage of the invention is that it improves fractal image compression by reducing compression time.

Another advantage of this invention is that it uses a learning algorithm to make choices between different transform families based upon local block characteristics and to rapidly partition images based upon local image characteristics.

Yet a further advantage of this invention is that it finds good domain to range block matches by combining the concept of lean domain pools, that is domain pools consisting of high variance blocks, with the concept of block classification. Lean domain pools reduce the size of the domain pool and hence may reduce search time. Block classification further reduces a search by classifying range and domain blocks and then only attempting to match domains to ranges that are in the same class as the range.

Yet a further advantage of this invention does not require a model of the environment.

Yet a further advantage of this invention is that it can be achieved with a high degree of parallelism.

To achieve the foregoing and other advantages, in accordance with all of the invention as embodied and broadly described herein, a method for coding an image comprising the steps of pre-smoothing an image, constructing a lean domain pool, classifying domain blocks in the lean domain pool, learning a Q-function, compressing the image and storing the image.

In yet a further aspect of the invention, a method for coding an image wherein the step of construction a lean domain pool further includes the steps of determining the various of domain blocks in a domain pool, and eliminating low variance domain blocks from the domain pool, thereby reducing the size of said domain pool.

In yet a further aspect of the invention, a method for coding an image wherein the step of learning a Q-function further includes the steps of learning no-split decisions, and learning split decisions.

In yet a further aspect of the invention, a method for decoding an image that was coded by a method comprising the steps of pre-smoothing an image, constructing a lean domain pool, classifying domain blocks in the lean domain pool, learning a Q-function, compressing the image, and storing the image, wherein the method for decoding the image comprises the steps of iterating the transforms used in the step of compressing the image using a pyramidal scheme to produce a decoded image, and post smoothing the image to reduce perceptible line artifacts.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
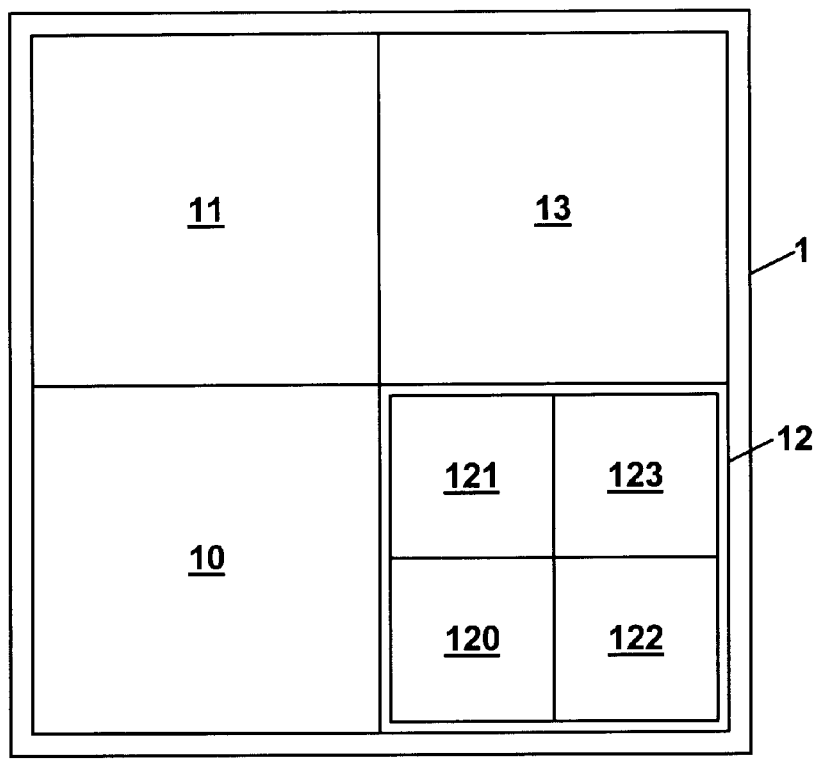
FIG. 1 is a block diagram showing a quad tree partitioned image.

The present invention implements a new method for compressing images. The result is that less computer disk space may be required for storage and transmission for applications such as web pages may be faster. This new method for compressing images improves fractal image compression by reducing compression time. The compression time reduction may be accomplished by using a learning algorithm called quad-Q-learning and by preferably using a new technique for finding good domain to range block matches. The learning algorithm may learn to make choices between different transform families and to rapidly partition images. Different regions of an image may best be represented as transformed domain blocks using different transforms. The learning algorithm may then learn to make the best transform choice based upon local block characteristics. Learning may also eliminate the trial and error required to find good image partitions, by learning to make decisions about how to partition an image based upon local image characteristics. Improved domain block to range block matching may be accomplished by combining the concept of lean domain pools, that is domain pools consisting of high variance blocks, with the concept of block classification. Lean domain pools may reduce the size of the domain pool and hence reduce search time. Block classification may further reduce a search by classifying range and domain blocks and then only attempting to match domains to ranges that are in the same class as the range.

Quad-Q-learning may divide large intractable problems into smaller, independent problems that may then be more readily solved, while minimizing the impact of sub optimization. The application of quad-Q-learning to fractal compression may improve the efficiency with which image partitioning and transform family selection is accomplished while considering the impacts of domain pool selection and domain to range matching. Quad-Q-learning applied to fractal image compression preferably proceeds in two phases, explore and exploit. During exploration, quad-Q-learning learns a policy function. This policy function may map attributes of image regions to decisions on how to partition and to decisions on transform family selection. In the exploration phase, quad-Q-learning may learn how to generalize from a few image regions to an entire image. This ability to generalize may improve the efficiency of fractal compression by mapping local region attributes to decisions that would otherwise require expensive trial and error to make. During exploitation, the policy learned during exploration may be used to make decisions during compression. There may be computational expense associated with learning; however, the benefits derived from learning may exceed its costs.

Images may be partitioned arbitrarily or adaptively. With arbitrary partitioning, an image may be divided into regions without regard to characteristics of the image. With adaptive partitioning, on the other hand, characteristics of the image may be considered. Standard fractal compression preferably starts with an arbitrarily chosen partition and attempts to compress based upon this initial partition. If a range in the partition is poorly coded, (i.e. the best domain match for the domain is worse than a chosen acceptability threshold), then the range may be divided into smaller ranges and each of these coded. This process may continue until all range codings meet an acceptability threshold. Quad-Q-learning may also learn to make a decision about whether or not to split a range into smaller ranges based upon local attributes of a range where a typical range attribute is range size and variance.

With respect to transform selection, standard fractal compression typically chooses a transform such as the affine transform or the bath transform, without regard to a particular image. The affine transformation transforms a pixel of a decimated domain block according to $P_r=SP_d+O$, where $P_r$ is an approximation of a desired range pixel, $P_d$ is a pixel of the decimated domain block, and s and o are parameters calculated to minimize the square error between the $P_r$ and the actual values of the range block pixels. The parameter s is often called the contrast parameter and o the brightness parameter. The Bath transformation transforms a pixel of a decimated domain block according to $P_r=s_zP_d+S_xX+S_yy+O$, where $P_r$ is an approximation of a desired range pixel, $P_d$ is a pixel of the decimated domain block, x and y are pixel coordinates with respect to the center of a block, and $s_z$, $s_x$, $s_y$ and o are parameters calculated to minimize the square error between the $P_r$ and the actual values of the range block pixels. The parameter $S_z$ is often called the contrast parameter and o the brightness parameter. Parameter $s_x$ and $s_y$ are slope parameters. The Bath transform consists of an affine transform part consisting of $S_zP_d+o$ and a bilinear part consisting of $s_xx+s_yy$. The rate distortion curve may be better when the affine transformation is used for some images, but better when the Bath transformation is used for others. Specifically, images with significant slope characteristics may be better compressed with the Bath transform. Quad-Q-learning provides the mechanism not only to partition an image, but also offers a technique for deciding between affine or Bath transforms for encoding individual ranges in an image.

Matching domains to ranges is basic to fractal image compression. The present invention combines the concept of "lean domain pools" with a variant of block classification to create an efficient method of matching domains to ranges.

Quad-Q-learning is an outgrowth of a popular learning algorithm called Q-learning, described in a paper by Christopher Watkins et al. entitled, "Technical Note Q-Learning," Machine Learning, Vol. 8, pp. 279–292, 1992. Q-learning assumes an environment that can be represented by a state and an agent separate from the environment. The agent may take an action that will cause an immediate reward and a change in the state of the environment. The objective of Q-learning is to maximize expected reward. Quad-Q-learning is similar to Q-learning in that there is an agent that takes an action that changes the environment and the objective is to maximize expected reward. Quad-Q-learning, however, may require a different notion of state than that of Q-learning. In quad-Q-learning there may be two types of actions: those that create new states called split type actions, and those that do not called no split type actions. When a split type action is taken, four new environments may arise, each with their own state. When a no split type action is taken, the corresponding environment's state may not change and no further actions may need to be taken with respect to that environment. To avoid confusion, the term block attribute, or just attribute may be used with respect to quad-Q-learning instead of state.

Figure 2:
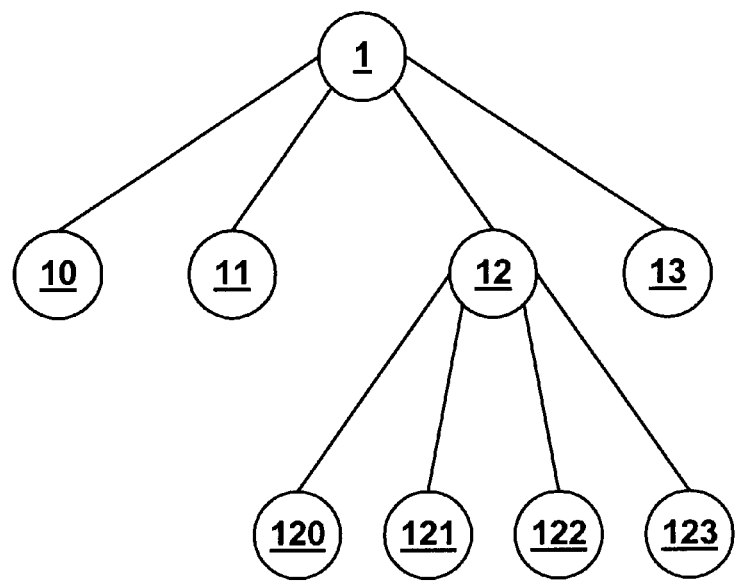
FIG. 2 is a quad tree graph representation of a quad tree partitioned image.

Quad-Q-learning may be best understood in the context of a quad tree partitioned image 1 as shown in FIG. 1. An attribute vector such as size and variance represents each image block in the quad tree partition. Blocks 10, 11, and 13 correspond to no split type actions; these blocks may be represented as transformed domains without further splitting. Block 12, however, corresponds to a split type action; four new blocks 120, 121, 122, and 123 may result, each with their own attribute vector. It is the four sub blocks of block 12 that may each be represented independently by transformed domains. FIG. 2 illustrates a quad tree graph representation of the quad tree partitioned image shown in FIG. 1.

An objective of quad-Q-learning is to learn a policy function, denoted as $\pi$, that may map local attributes of an image block to a decision on whether or not to split the block and, if the decision is not to split the block, whether to use the affine or Bath transform to code it. This decision may be made in a way that will lead to a decompressed image of the desired quality while preferably maintaining good compression. Once the policy function has been learned, the policy function may be used to make rapid decisions based upon local block attributes on how to partition an image and which transform to use for coding each of its blocks. The policy function may be learned by generalizing from a few image blocks to make decisions about an entire image. The ability to generalize may improve the performance of fractal compression.

Unlike supervised learning where teacher input provides gradient information directing a leaning system how to modify its behavior to improve system performance, quad-Q-learning may receive a scalar input from the environment that only evaluates system performance. That is, the environment may be assumed to provide no clue on how to modify behavior to improve compression performance. In quad-Q-learning, the directional information needed to determine how to improve performance may be determined by the learning agent through exploration. Exploration tends to slow compression because of the computational effort required to learn the policy function. On the other hand, once the policy function is known, exploiting it to make decisions about whether or not to split a block and which transform family to use to code a block may yield a significant reduction in computation required. It is important that the benefits of exploiting a policy are greater than the cost of exploration for its determination. This problem is known as the conflict between exploration and exploitation.

We now describe quad-Q-learning as an aspect of the present invention for learning a policy function $\pi$. With respect to fractal compression, it may be more convenient to work with costs instead of rewards. Costs may be thought of as negative reward, but it may be convenient to use a version of quad-Q-learning that may handle costs directly. We are actually interested in two costs, one corresponding to image quality and one corresponding to image compression. These costs and their use will be described later. Also, instead of learning $\pi$ directly, we will preferably learn a Q function that will map a block attribute vector and action to an expected cost. The block attribute may consist of two components, block size and block variance. For each block size and each action the value of the Q functions may be assumed to be a linear function of range variance. Block size, as may be seen from FIG. 1, may be a discrete value because of the nature of quad tree partitioning. Variance, on the other hand may be a continuous attribute. Hence the local block attribute of a block may be denoted as (i,x) where "i" is an index of block size and x is the continuous valued block variance. There may be four possible actions; these are 1) code as an affine block, 2) code as a Bath block, 3) split as an affine block, and 4) split as a Bath block. Hence the expected cost of an action "a" on a block with attribute (i,x) may be denoted as Q(i,x,a). The policy function $\pi$ may be related to Q as $$\pi(i, x) = \arg\min_{a} Q(i, x, a) \quad (1)$$

The present invention learns Q and uses (1) to obtain $\pi$. Assume that Q can be expressed in the following form $$Q(i,x,a) = m_{i,a}\sqrt{x} + b_{i,a} \quad (2)$$

The Q function may be learned by learning estimates of $m_{i,a}$ and $b_{i,a}$. At each time step "n" in the learning process, estimates $m_{i,a}^n$ and $b_{i,a}^n$ which may be used to obtain estimates $Q^n(i,x,a)$ may be obtained.

Below, a method for estimating $m_{i,a}$ and $b_{i,a}$ is presented. A time step corresponds to visiting a range block in an image. At each time step of the learning procedure, a potential range block in an image with attribute vector (i,x) may be considered. A no split decision "a" may correspond to a decision to code a block using the affine transform or the Bath transform. A split type decision may correspond to a decision to split a block and use only the affine or only the Bath transform to code sub blocks. A time step "n" may correspond to visiting a single range block in an image. The first range block visited is time step 1, the second range block visited is time step 2, and so forth.

The no split action estimation procedure will now be described. Letting $z_k = \sqrt{x^k}$ in equation (2) and $$\bar{z}^n = \frac{1}{n}\sum_{j=1}^{n} z_k$$

where k is an index representing the $k^{th}$ block of size "i" (typically, 4×4, 8×8, 16×16 or 32×32) considered for action "a" (code Bath or code affine) and n is the number of blocks visited. Also let $c_k(i,x^k,a)$ be an instance of the cost of no split action "a" for a block with attribute $(i,x^k)$ and let $$\bar{c}^n(i, a) = \frac{1}{n}\sum_{k=1}^{n} c_k(i, x^k, a).$$

Then one way to estimate $m_{i,a}$ and $b_{i,a}$ is as follows:

$$m_{i,a}^n = \frac{\sum_{k=1}^{n}(z_k - \bar{z}^n)c_k(i, x^k, a)}{\sum_{k=1}^{n}(z_k - \bar{z}^n)^2} \quad (3)$$

$$b_{i,a}^n = \bar{c}^n(i, a) - m_{i,a}^n \bar{z}^n \quad (4)$$

where the denominator of (3) is assumed to increase infinitely as n increases without bound. Equations (3) and (4) may just be equations for calculating regression coefficients where $Z_k$ are the independent variables and $c_k$ are the dependent variables. In other words, the parameters of a linear function relating block variance and cost of coding may be estimated.

For the split action case first determine $v_n(i,x^k,a)$ as follows $$v_n(i, x^n, a) = \min_b Q_n(j, x_0^n, b) + \min_c Q_n(j, x_1^n, c) + \min_d Q_n(j, x_2^n, d) + \min_e Q_n(j, x_3^n, e) \quad (5)$$

where $(j,x_k^n)$, k=0, 1, 2, 3, are the attributes of the four blocks resulting from splitting a block with attribute $(i,x^n)$ and $Q_n(j,x_k^n,b)$ are estimates of $Q(j,x_k^n b)$. Estimate $m_{i,a}$ and $b_{i,a}$ for split actions as follows:

$$m_{i,a}^n = \frac{\sum_{k=1}^{n}(z_k - \bar{z}^n)v_k(i, x^k, a)}{\sum_{k=1}^{n}(z_k - \bar{z}^n)^2} \quad (6)$$

$$b_{i,a}^n = \bar{v}^n(i, a) - m_{i,a}^n \bar{z} \quad (7)$$

where it may be assumed that the denominator of (6) increases infinitely as n increases infinitely and $$\bar{v}^n(i, a) = \frac{1}{n}\sum_{k=1}^{n} v_k(i, x^k, a).$$

Equations (6) and (7) may be regression equations where $z_k$ may be independent variables and $v_k$ may be dependent variables which estimate the cost of splitting a block. Split costs may be estimated for a block by calculating the sum of the minimum estimated costs for the resulting four sub blocks. The split and no split cases may be similar. In the no split case, the dependent variable cost may be estimated as a linear function of block variance. The split case may be the same, except that the dependent variable may be estimated from estimates of child blocks. That is, the estimates may be bootstrapped.

Figure 3:
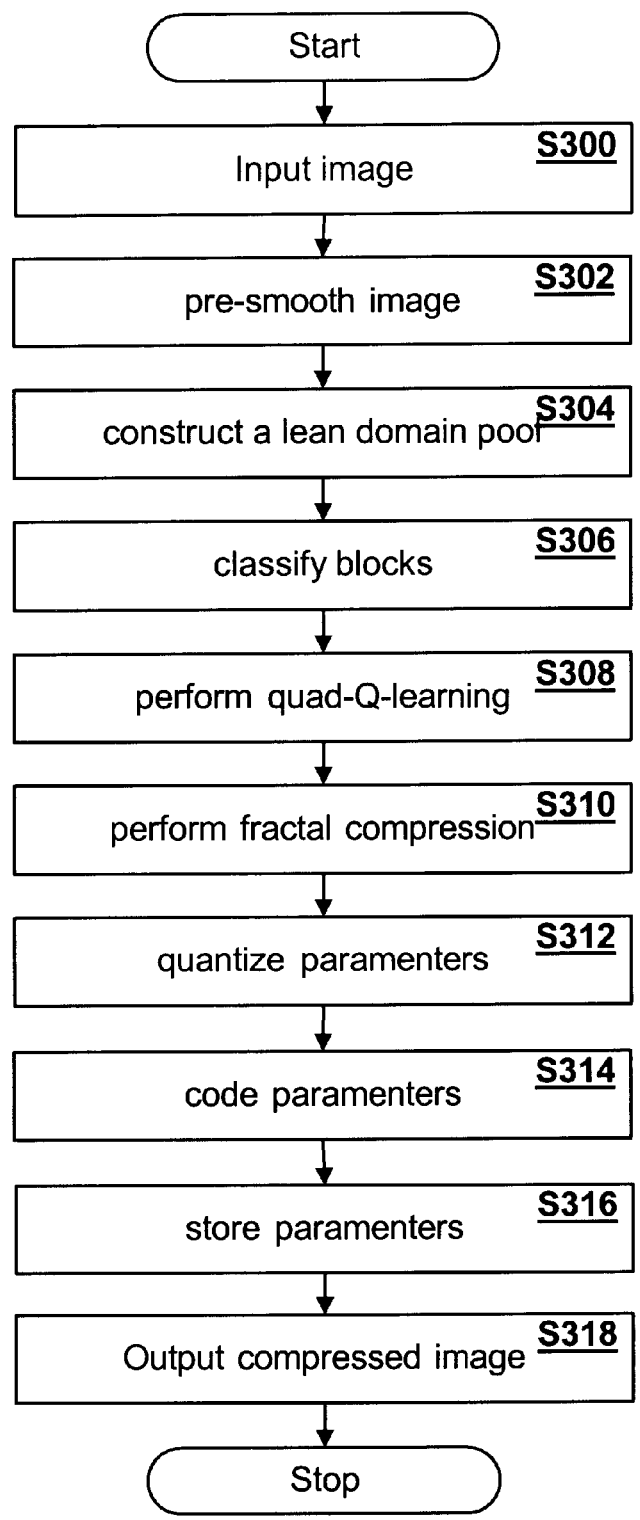
FIG. 3 is a flow diagram showing the phases of applying quad-Q-learning to fractal compression.

FIG. 3 is a flow diagram showing the phases of applying quad-Q-learning to fractal compression. The phases include: image input S300; image pre-smoothing S302; lean domain pool construction S304; block classification S306; quad-Q-Learning S308; fractal compression S310; parameter quantization S312; parameter coding S314; and storage S316; and image output S318.

The purpose of image pre-smoothing S302 is to reduce high frequency content of an image that is not noticeable but which may make compression more difficult. Pre-smoothing may be accomplished by convolving an image with a Gaussian. One skilled in the art will recognize that many method exist for presmoothing an image including using various types of low pass filters. The purpose of lean domain pool construction S304 and block classification S306 is to speed compression while minimizing degradation to the rate-distortion curve that measures the compression to image quality trade-off. The purpose of the learning phase S308 is to learn a Q function which may be used to partition an image and to make decisions about which transform, affine or Bath, to use for regions in an image based upon local block attributes. The fractal compression phase S310 may exploit the Q function to encode an image. Parameter quantization S312 may reduce the number of significant digits of real parameters calculated during the fractal compression phase so that the tradeoff between compression and image quality is acceptable. Parameter quantization may actually be decided before compression begins and its effects may be considered throughout the compression process. Parameter coding S314 may increase compression by taking advantage of the non-uniform distribution of parameter values; fewer bits may be assigned to frequently occurring values. Finally, the storage structure S316 may also improves compression by representing domain block to range block assignments so as to minimize the bits needed for range and domain block addresses. The compressed image may be output at step S318.

As previously mentioned, the collection of domains available is typically called the domain pool. It is the domain pool that is searched for good matches with range blocks. The larger the domain pool, the more searching that may be done and hence the greater the chance of finding a good match for each range block. However, the disadvantage of a large domain pool is that, even though more searching is possible, larger compression times may be required to search. One approach to reducing compression time is therefore to reduce the size of the domain pool by keeping only "good candidate" domains. In a paper by Saupe entitled, "Lean domain pools for fractal image compression, Conference Proceedings of SPIE Electronic Imaging '96, 1996, it was suggested that only high variance domain blocks should be included in the domain pool. It was shown experimentally that compression time may be reduced on average by 85% over exhaustive search when only the top 15% of domain blocks (as measured by block variance) are kept in the domain pool, without adversely affecting the rate-distortion curve. The experimental work referenced in the Saupe paper applied only to the affine transformation. A theoretical justification is given in a Doctoral Dissertation by Clifford Clausen entitle, "Fractal Image Compression Using Quad-Q-Learning", George Mason University, 1998, for why high variance domain pools make sense for both affine and Bath transforms.

To take full advantage of the lean domain pool, a domain block addressing scheme may be required that allows fewer bits to be used to identify individual domain blocks. White block skipping is proposed by Saupe in the previously mentioned paper as a method for accomplishing this and is the technique that the present invention uses as a basis for domain block addressing. White block skipping records quad-tree blocks that do not have high variance blocks in them. Regions that are not recorded may then be high variance blocks. Saupe describes a "white block skipping" technique.

A variety of block classification schemes have been developed for affine transformation methods. However, none of these schemes may be directly applicable when lean domain pools or Bath transforms are employed. Typically, the problem with block classification used with lean domain pools is that a large fraction of the classes have no domains in them because the classifications schemes were designed under the assumption that more domains would be available than are found in lean domain pools. The result is that there is a high probability that a range block will be classified into a class that has no domains in it and therefore finding a suitable domain may be problematic. Moreover, compression methods that use the Bath transform may use local search strategies instead of block classification because it is difficult to develop a classification scheme that is invariant to the Bath transform. An important property of a block classification scheme may be that if a domain block D is classified by the scheme into class A, then the transformed D must still be in class A when any member of the available set of transforms is applied to it. This property may be important because range blocks are classified and a domain is preferably selected from the same class before the transform is calculated and applied to D. Another important property of the classification scheme may be that given any domain block and range block in the same class, there may exists a transform in the available set of transforms that may transform the domain block to a block close to the range block. It may be assumed that two blocks in different classes are not close to each other. In practice, these properties are sometimes violated but are usually true. Since we may employ both the affine transform and the Bath transform, it may be desirable to have one classification scheme that is effective for both classes of transforms, otherwise, more computation time may be required to calculate two different classes for each block. In addition, we may want to be able to determine the rotation and reflection required to best match a domain to a range directly from the classification scheme without trying all eight possibilities typically used. There may be four rotations and one reflection possible when matching a domain block to a range block. Thus, there are eight rearrangements of domain block pixels through rotation and reflection. The present invention may use such a classification scheme.

Figure 4A:
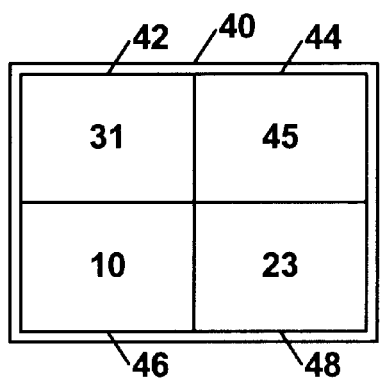
FIG. 4A is a block diagram showing quadrant block averages for a block.
Figure 4B:
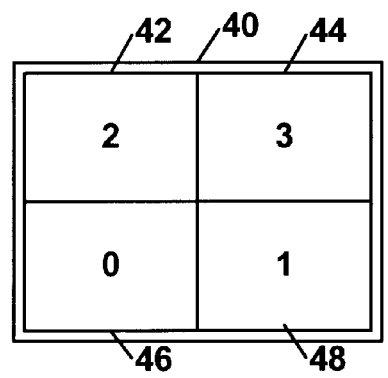
FIG. 4B is a block diagram showing ordinal values for a block.

The technique employed by the present invention may assign a classification to a block based upon the quadrant sub block averages and variances. Here we may only be interested in quadrant averages. FIG. 4A illustrates quadrant block averages for a block 40, and FIG. 4B illustrates the ordinal values for the same block. Block 42 has an average value of 31, block 44 has an average value of 45, block 46 has an average value of 10, and block 48 has an average value of 23. Each quadrant of a block is assigned the ordinal value 0–3 of its average relative to the other quadrant averages as illustrated in FIG. 4B. Block 42 has an ordinal value of 2, block 44 has an ordinal value of 3, block 46 has an ordinal value of 0, and block 48 has an ordinal value of 1. There are 4!=24 ways that ordinals may be assigned. However, there are eight rotation/reflection transformations possible and hence some ordinal assignments may be transformed into others. Note that a rotation and/or reflection may not change the pairings of diagonally opposite quadrant block ordinal assignments. For example, if ordinal 0 is paired diagonally with ordinal 3 (and consequently ordinal 1 is paired with ordinal 2), rotation and/or reflection may not change this pairing. There are 3 diagonal pairings that may be possible (0–1, 0–2, and 0–3) and each of these pairings may permit 8 different ordinal assignments each of which may be transformed into the other by rotation and/or reflection. Thus all 8×3=24 ordinal assignments may be accounted for. The eight rotation/reflections may induce 3 equivalence classes each consisting of 8 ordinal assignments. One ordinal assignment in each class may be picked to represent the class and this assignment may be referred to as the canonical assignment. Domain blocks may be classified into one of these three equivalence classes and in addition the rotation/reflection required to take the domain to canonical form (called the canonical rotation/reflection) may be recorded. When range blocks are classified, the canonical rotation/reflection may also be calculated. Knowing the canonical rotation/reflection for the range block and domain block, assuming both are in the same average equivalence class, may be enough to calculate the rotation/reflection required to match the domain ordinal assignment to the range ordinal assignment.

The next problem to address is obtaining the correct number of block classes. The block classification method mentioned above which uses both average and variance ordinals results in 72 block classes which is too many when lean domain pools are used. The present invention may use just the 3 classes obtained by quadrant averages described above and obtain good results, however, more than 3 classes may often be useful. It may work well to have more small blocks in the domain pool than large blocks and hence it may be useful to have different numbers of block classifications based upon block size. Large numbers of small domain blocks may be used since calculating transform parameters for small blocks may be computationally inexpensive and because it may maximize the chances of finding good encodings for all regions of an image. Small numbers of large blocks may be used since, usually, only low variance blocks may be matched anyway. Low variance blocks may be matched easily and don't require many, domains in the domain pool. Thus, having more large blocks usually only serves to increase computation time. For 256×256 pixel images between 3 and 18 classes are ideal, depending on block size. This may be accomplished by considering the differences between block averages where the difference pairings may be based upon average ordinals and then looking at the ordinals of these differences. Table 1 below serves to illustrate how difference ordinals may be calculated. Notice that there are three ordinal pairings, 1–0, 2–1, and 3–2 and there are also three difference ordinals, 0, 1, and 2. Hence, there are 3!=6 possible ordinal pairing to difference ordinal assignments and thus there are 6 block classifications. When the 6 difference ordinal classifications are combined with the 3 possible average ordinal classifications, 18 classes are obtained. Just 2 difference ordinal classifications may be obtained by considering only two of the three possible ordinal pairings, say 1–0 and 3–2. When the two classes are combined with the 3 average ordinal classes, 6 block classes may be obtained. Hence there are now techniques for obtaining 3, 6, or 18 classes.

TABLE 1

Difference Ordinal Example

| Block | Average | Average Ordinal | Ordinal Pairing | Average Difference | Difference Ordinal |
|---|---|---|---|---|---|
| 0 | 10 | 0 | 1–0 | 13 | 1 |
| 1 | 31 | 2 | 2–1 | 8 | 0 |
| 2 | 23 | 1 | 3–2 | 14 | 2 |
| 3 | 45 | 3 | | | |

When the affine transform is applied to a domain block, the domain block classification using any of the techniques just described may be unchanged. Therefore, a domain from the domain pool of the same class as a target range block may be selected and knowing that the transformed domain may be of the same class as the range. However, in general, applying the Bath transform to a domain block classified by any of the above techniques may change the domain block classification. This may be problematic because there may not be a guarantee that the transformed domain block will be of the same class as the range block, even though the original domain may be of the same class. A way to overcome this difficulty will now be described. The Bath transform may approximate the pixels of a range block by transforming a decimated domain block as $z'=s_x x+s_y y+s_z z+o$ where x and y are the coordinates of a range pixel and corresponding decimated, rotated and reflected domain block pixel, z is the gray-scale value of the reflected, rotated and decimated domain block pixel at location (x,y), z' is the approximated gray-scale value of the range block, $s_x$, $s_y$, and $s_z$ are scaling factors and o is an offset. The Bath transform may be viewed as coding a block as the sum of two parts: a functional part, $s_x x+s_y y+o_1$; and a domain matching part, $S_z z+o_2$, where $o \times o_{1+o2}$. The functional part approximates an image block as a parameterized function of (x,y) and the domain matching part is an affine transformation of a domain block that attempts to match the difference between the range block and the functional approximation (called the range block residual).

Figure 5:
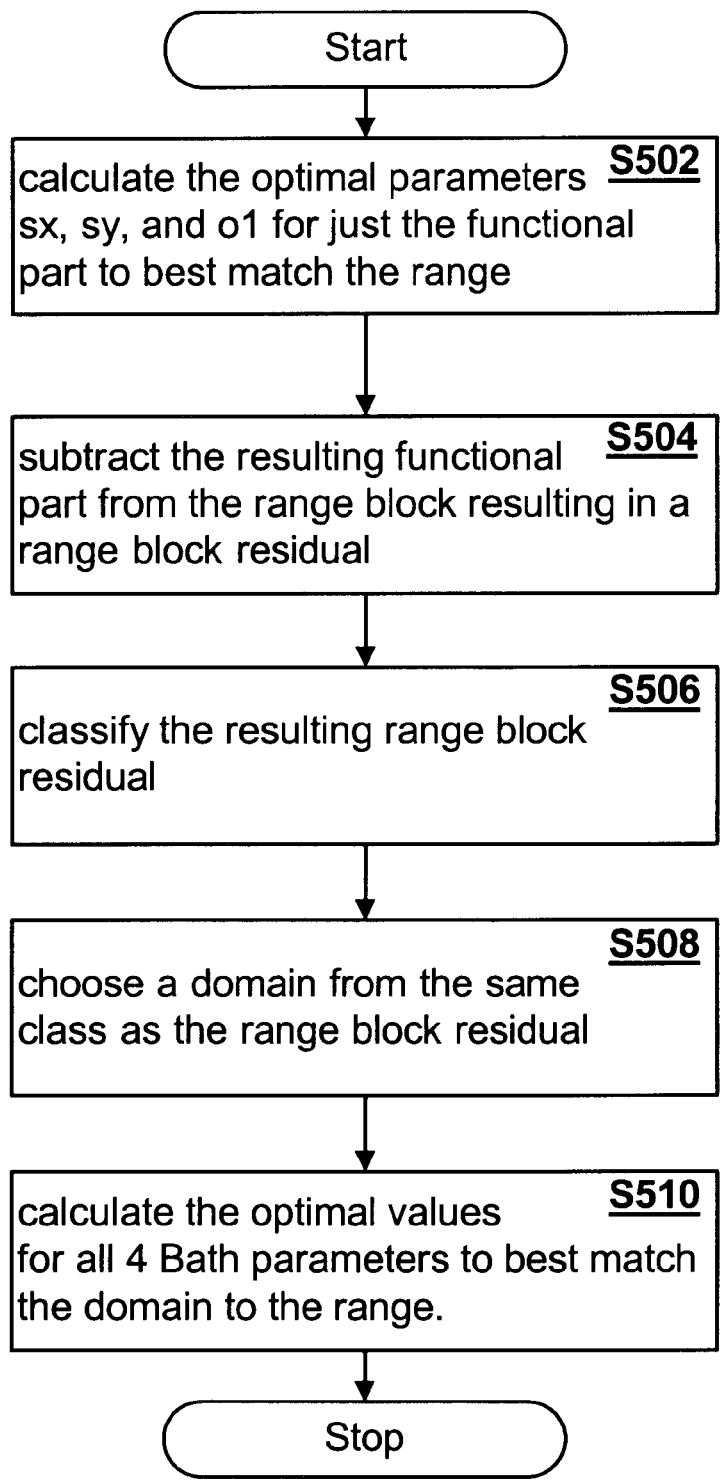
FIG. 5 is a flow diagram of an aspect of the present invention showing domain matching.

FIG. 5 is a flow diagram of an aspect of the present invention showing domain matching. This approach includes: calculating the optimal parameters $s_x$, $S_y$, and $o_1$ for just the functional part to best match the range S502; subtracting the resulting functional part from the range block resulting in a range block residual S504; classify the resulting range block residual S506; choosing a domain from the same class as the range block residual S508; and calculating the optimal values for all 4 Bath parameters to best match the domain to the range S510.

Suppose that in step S510 optimal values for just parameters $s_z$ and $o_2$ were calculated and values were kept from step S510. Then the affine transform of the domain block to residual range block would be calculated and the affine transform may not change the block classification of the domain block. Hence the transformed domain would be of the same class as the residual range block. In this case there would be sub optimal Bath transform parameters $s_x$ and $s_y$ from step S502, $s_z$ from step S510 and $o=o_1+o_2$ from steps S502 and S510. Calculating the optimal Bath parameters in step S510 may do at least as well as this procedure. The procedure above may thus allow the same block classification scheme to be used as for affine transformations.

Quad-Q-learning may learn a Q function that captures the relationship between cost, local block attributes and a decision on how to encode a block. In other words, quad-Q-learning may reduce what would otherwise be an expensive global search to a decision based upon local block characteristics. A decision determines whether or not a block may be split and what transform method, either affine or Bath, may be used to encode a range block.

Two different costs may be used; one is an estimation of the quality of the reconstructed image measured as root mean square (RMS) distance between the original image and the decoded image, and the other is an estimation of compression measured as the number of bits that it takes to encode a block. These two costs may be used during learning of two different Q functions, one corresponding to image quality and the other corresponding to image compression. Learning the Q function with respect to quality cost may be done as previously described. The policy implied by this Q function (equation (1)) might be used to calculate the Q function for compression cost. The Q function corresponding to image quality may tend to drive the compression algorithm toward image partitions with a large number of small blocks because the quality cost for small blocks is smaller. The Q function corresponding to image compression may tend to drive the compression algorithm toward image partitions with a small number of large blocks because the compression cost may be smaller for large blocks.

With respect to image quality, it is unfortunate that during the compression process, it may not be possible to determine the quality of the coded image blocks, at least not exactly, without first encoding the image, and then decoding the image. However, Barnsley's Collage Theorem described by Michael Barnsley in the book entitled, "Fractals Everywhere", Academic Press Professional, Boston, Mass., 1993. provides a tool for estimating the RMS distance between an original block and a reconstructed block. This estimation is the RMS distance between the transformed domain block and the range block. The quality cost of a domain block and range block match may be the RMS distance between the decimated, rotated, reflected and transformed domain block and the range block which may be calculated as $$\text{RMS} = \left(\frac{1}{n}\sum_{k=1}^{n}(s_i a_k + o_i - b_k)^2\right)^{\frac{1}{2}} \quad (8)$$

where n is the number of pixels in the range block, $a_k$ is the $k^{th}$ domain block pixel, $b_k$ is the $k^{th}$ range block pixel, and $s_i$ and $o_i$ are parameters calculated to minimize the RMS distance.

Next we examine compression cost. Compression may be affected by two factors; these are the number of range blocks being encoded and the transform type being used. For a particular transform type each range block may require an approximately fixed number of bits to encode, regardless of block size. The number of bits a transform requires may not be exactly fixed because the number of bits to encode a range block may vary slightly due to adaptive Huffman coding and the storage structure used to improve compression. The transform used may affect compression because the affine and Bath transforms may require different numbers of parameters and hence, different numbers of bits to store them. In fact the affine transform, depending on the parameter quantization used, generally requires fewer bits per block than the Bath transform. The Bath transform, although requiring more bits per block, generally requires fewer blocks to code an image and hence may sometimes out perform the affine transform. The compression cost used by the present invention for an image block is the approximate number of bits required to code the block.

Quad-Q-learning may be viewed as proceeding in two stages; the first stage (illustrated in FIG. 6) learns the Q function for no split type decisions and the second stage (illustrated in FIG. 7) learns the Q function for split type decisions. Although the present invention is being described with the use of two stages, one skilled in the art will recognize that it may not be necessary to distinguish between these stages.

Figure 6:
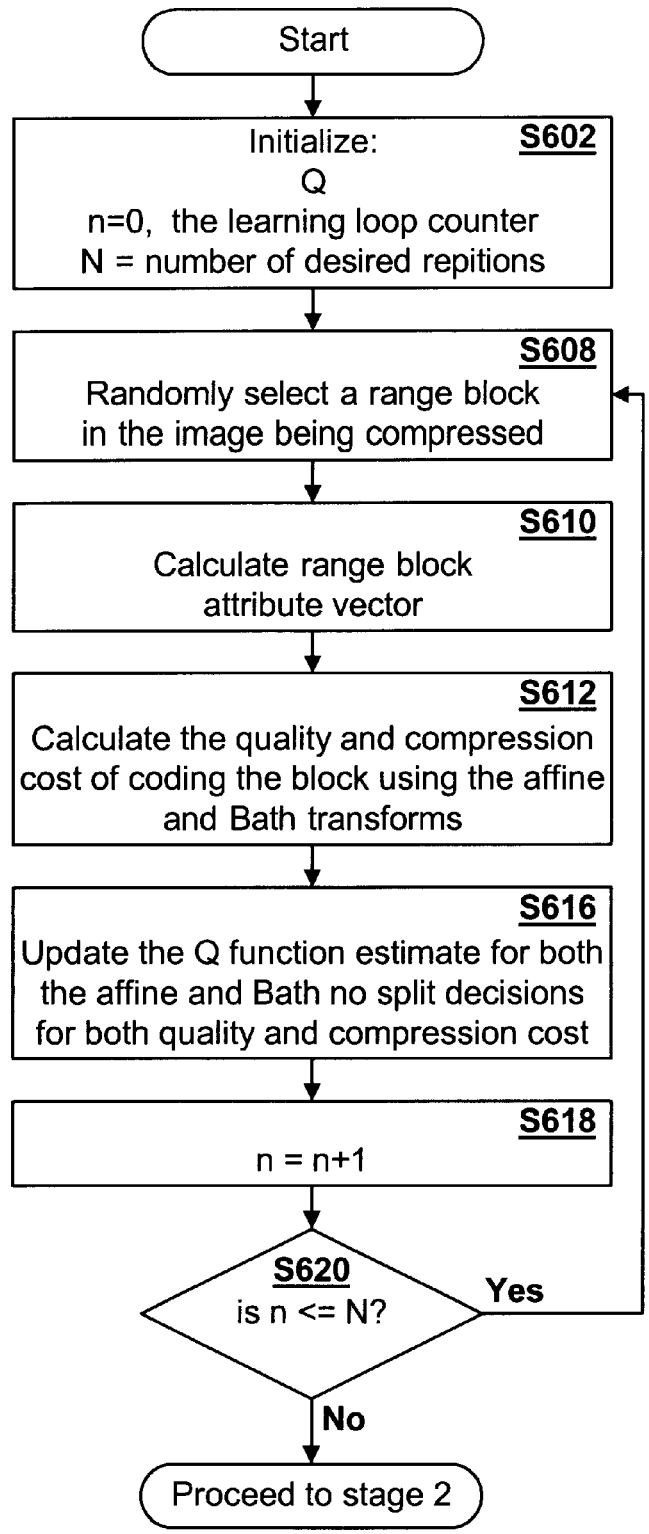
FIG. 6 is a flow diagram of an aspect of the present invention showing quad-Q-learning no split decisions.

In general, stage one of the algorithm may proceed as shown in FIG. 6 where the Q function for no-split type actions is calculated. That is, if "i" is the index for range block size, "x" is the range block attribute (e.g., block variance) and "a" is a no split action, either affine or Bath, then the Q function, Q(i,x,a) may be an estimation of the quality cost of coding a block of size "i" with variance "x" using transform type "a". Initializations for Q, the learning loop counter n, and the Number of desired repetitions N are done at step S602. Q may be initialized by setting $m_{i,a}^0$ and $b_{i,a}^0$ to arbitrary initial values or to values learned from a previous image. Step S608, a range block in the image being compressed may be randomly selected. Next at step S610, the range block attribute vector may be calculated. At step S612, the quality and compression cost of coding the block using the affine and Bath transforms is calculated. Then at step S616, the Q function estimate for both the affine and Bath no split decisions for both quality and compression cost may be updated. Finally, the learning loop counter may be incremented at step S618 and a determination made at step S620 as to whether the number of desired repetitions has been executed. If the determined at step S620 that more repetitions need to be run, then processing proceeds at step S608. Otherwise, processing may proceed to stage 2.

Figure 7:
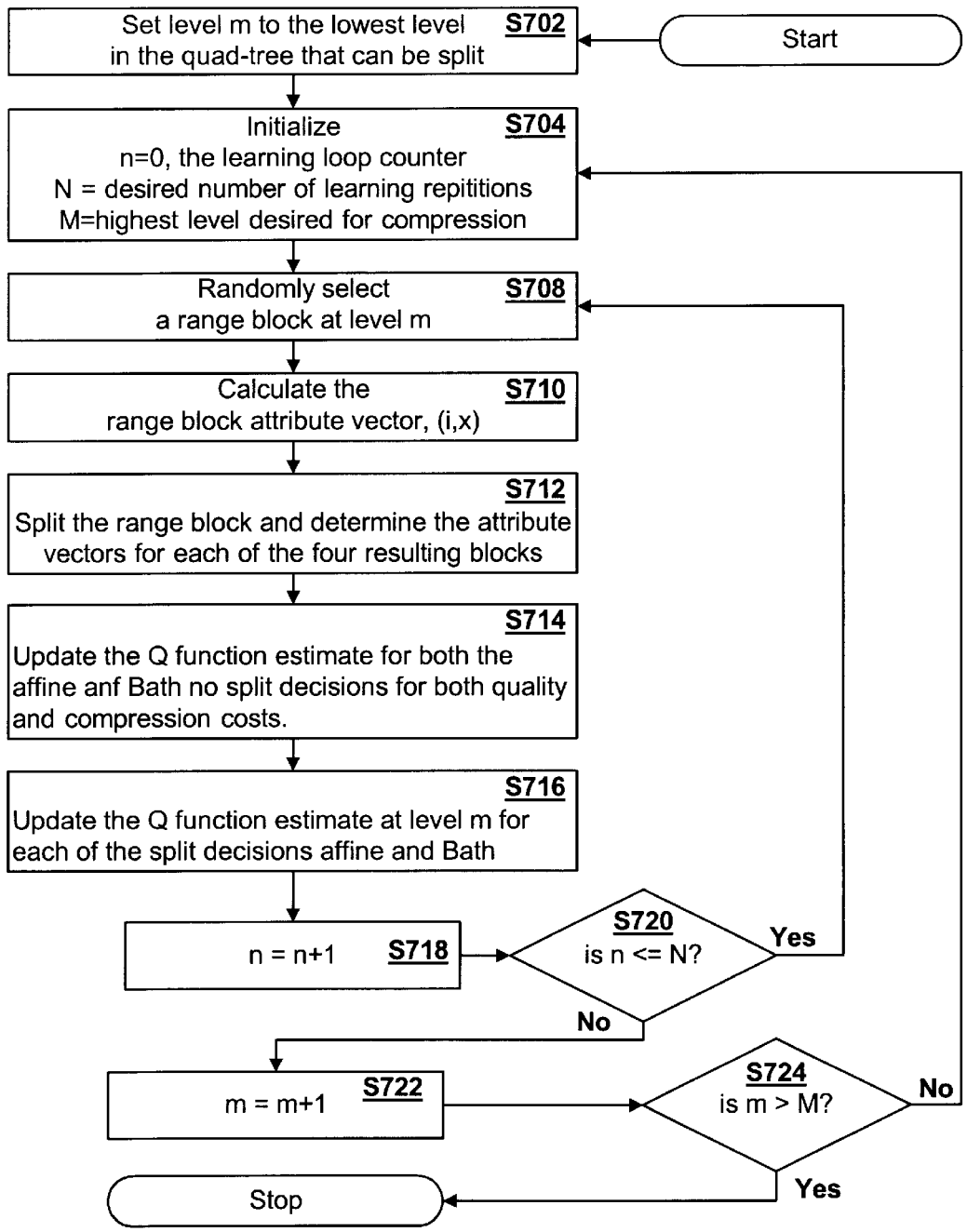
FIG. 7 is a flow diagram of an aspect of the present invention showing quad-Q-learning split decisions.

Next we discuss how learning proceeds for the split action case (second stage), illustrated in FIG. 7. The term quad-tree level is used to indicate the current position in a quad tree. A higher level in a quad-tree corresponds to a larger block size while a lower level corresponds to a smaller block size. For example, level 0 corresponds to a 1×1 block (a pixel), while level 2 corresponds to a 2×2 block and level 3 to a 4×4 block. In general a block at level m of a quad-tree is of size $2^m \times 2^m$. In stage 2, preferably no costs are calculated; rather costs may be calculated in stage 1 and Q function estimates from the previous level of stage 2 may be passed up in the quad-tree. That may be the cost of splitting a block of size $2^k \times 2^k$ is an estimate of the sum of the minimum Q function estimates of each quadrant block.

Stage 2 starts at step S702 where level m may be set to the lowest level in the quad-tree that may be split. This level might for example have blocks of size 8×8. Splitting a block of size 8×8 results in four blocks each of size 4×4. Next, at step S704, several initializations may take place. The learning loop counter n may be initialized to 0, variable N may be set to the desired number of learning repetitions, and variable M may be set to the highest level desired for compression. At step S708, a range block at level m in the image being compressed may be randomly selected. After that, the range block attribute vector, (i,x) may be calculated at step S710. Subsequently, at step S712, the range block may be split and the attribute vectors $(j_k, X_k)$, k←0, 1, 2, 3, for each of the four resulting blocks may be determined. Then at step S714, the Q function estimates for both the affine and Bath no split decisions for both quality and compression cost may be updated using off-policy learning for quality cost and using the policy implied by the Q function for quality cost. At step S716, the Q function estimate at level m for each of the split decisions affine and Bath, based upon the Q function for each of the attributes $(x_k, j_k)$ at level m-1 may be updated. Next, at step S718, n may be incremented. A determination may be made at step S720 as to whether n exceeds the desired number of learning repetitions for the current level. If n did not exceed the desired number of learning repetitions for the current level then processing may continue at step S708, otherwise processing proceeds to step S722. At step S722, m is incremented. Then at step S724 it is determined if m is greater than the highest level desired for compression. If it is, the algorithm is terminated, otherwise, processing is returned to step S704.

Figure 8:
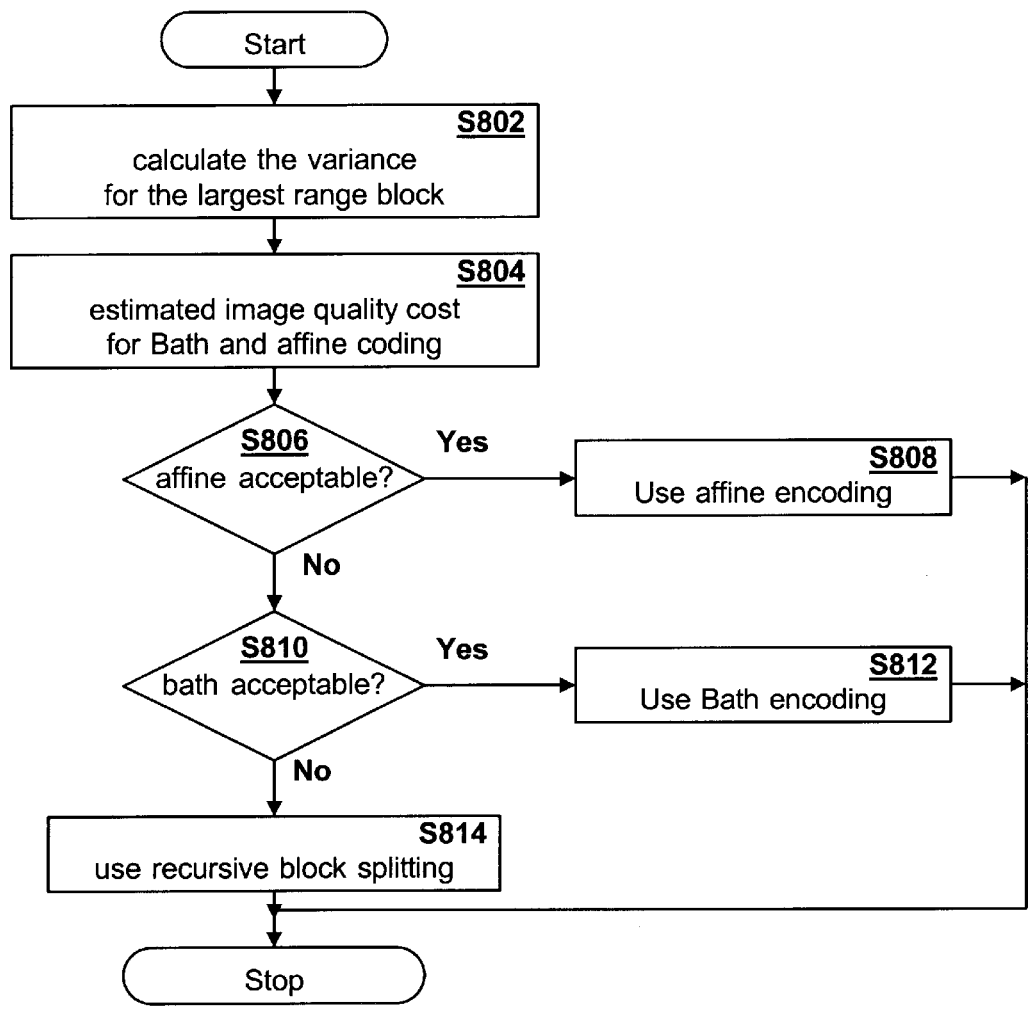
FIG. 8 is a flow diagram of an aspect of the present invention showing how a decision is made as to whether a block should be affine encoded, Bath encoded or recursively split.
Figure 9:
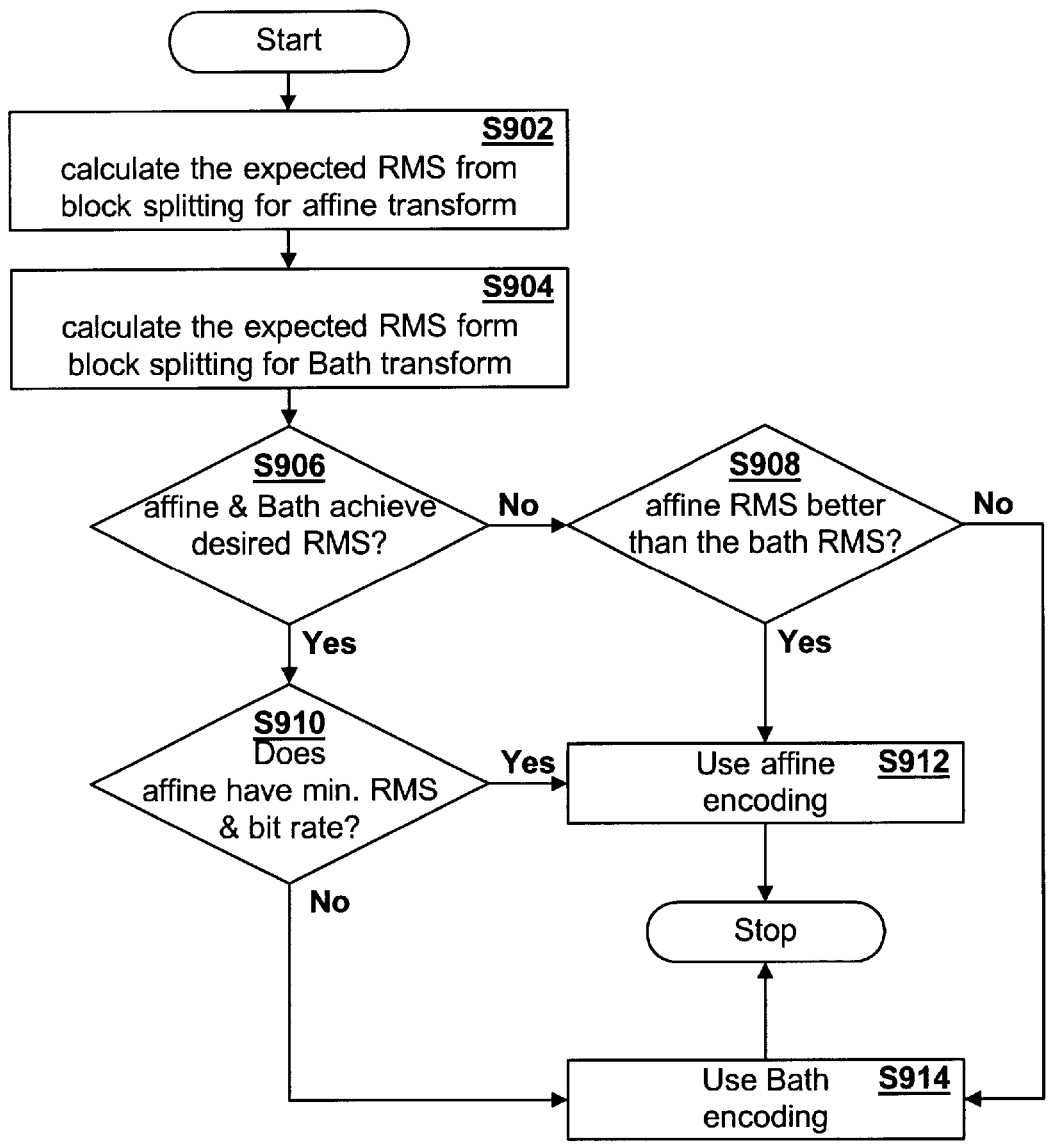
FIG. 9 is a flow diagram of an aspect of the current invention showing how the transform for a block of largest size may be chosen.
Figure 10:
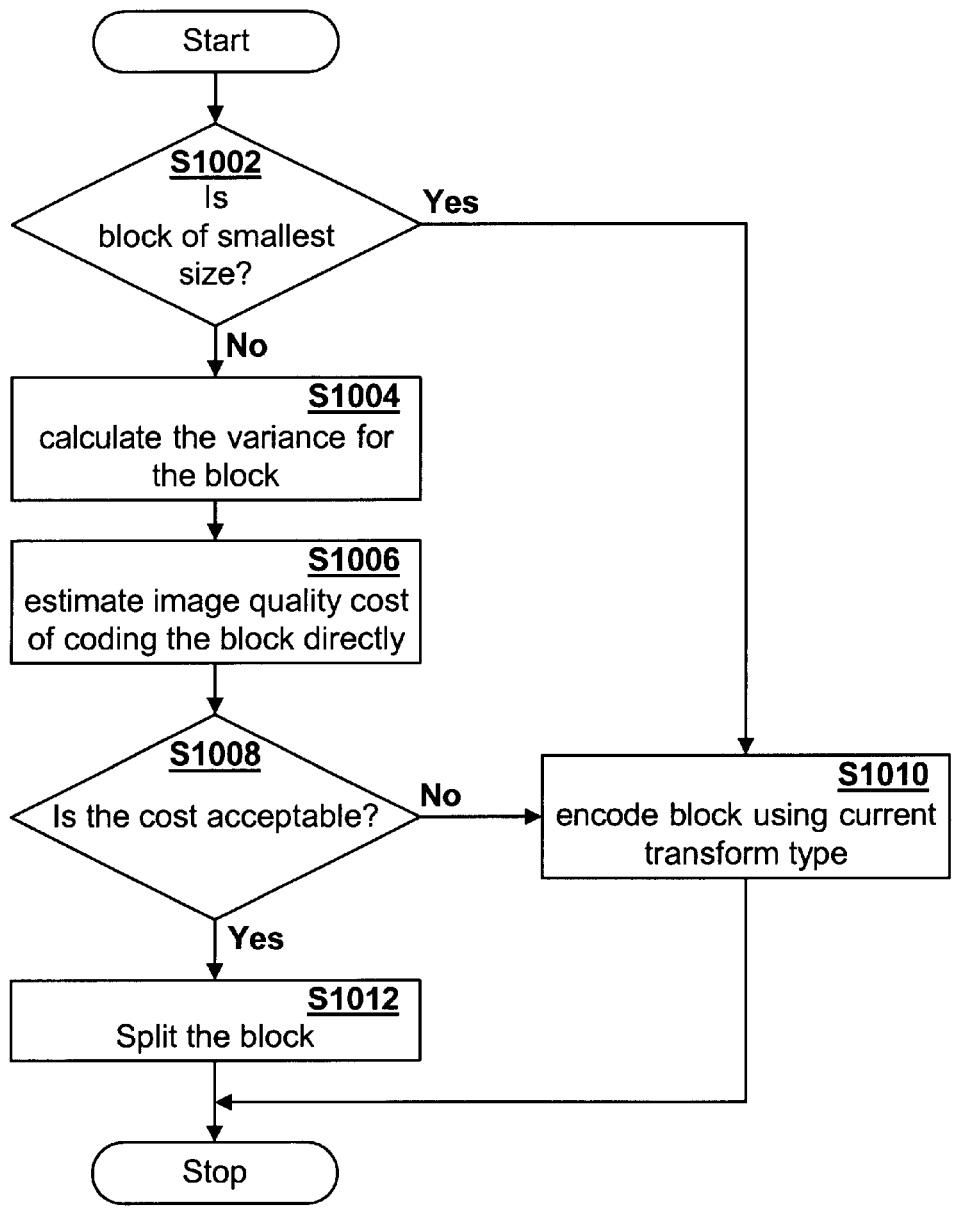
FIG. 10 is a flow diagram of an aspect of the current invention showing how a decision may be made as to whether to further split a smaller block or to encode it using the current transform type.

FIGS. 8, 9 and 10 are flow diagram that shows how the present invention implements fractal compression using the Q function. FIG. 8 shows how a decision may be made as to whether a block should be affine encoded, Bath encoded or recursively split. FIG. 9 shows how the transform for the block of largest size may be chosen. FIG. 10 shows how a decision may be made as to whether to further split a smaller block or to encode it using the current transform type.

Referring to FIG. 8, we can see how a decision may be made as to whether a block should be affine encoded, Bath encoded or recursively split. First, the variance for the largest range block is calculated at step S802. At step S804 the variance, block size, and the Q function are used to determine the estimated image quality cost (RMS) of directly coding the block using each of the affine and Bath transforms. If the affine transform is determined to be acceptable at step S806, then a decision to use the affine transform may be made S808 since it requires fewer bits. (A typical acceptance criterion may be RMS≦8. N is the number of pixels in a block. Numbers larger than 8 may increase compression and decrease quality. Numbers smaller than 8 may decrease compression and increase quality.). Otherwise, a determination may be made at step S810 as whether the Bath transform is acceptable. If the determination is affirmative, then a decision to use the Bath transform may be made S812. If neither Bath nor affine transforms will achieve the desired quality by direct coding, then a decision to recursive block splitting may be made at step S814.

FIG. 9 shows how the transform for the block of largest size is chosen. The Q function may be used to determine the expected RMS from block splitting. At step S902, a calculation may be made of the expected RMS from block splitting for the affine transform. At step S904, a calculation may be made of the expected RMS from block splitting for the bath transform. A determination may then be made at step S906 as to whether both transforms achieve the desired RMS through block splitting, as determined by the Q function. If the determination is positive at step S906, then a new determination may be made as to whether the affine transform has the minimum product of expected RMS and expected bit rate at step S910. If the determination at step S910 is positive, then a decision to use affine encoding may be made at step S912. Otherwise, a decision to use bath encoding may be made at step S914. If the determination at step S906 was made that neither transform achieved the desired RMS through block splitting, then a new determination is made at step S908 as to which transform has the best expected RMS. If the determination at step S908 is that the affine transform had a better than expected RMS, then a decision may be made at step S912 to use affine encoding. If the determination at step S908 is that the Bath transform had a better expected RMS, then a decision may be made at step S912 to use bath encoding. Once the transform for the block of largest size is chosen, only that transform is preferably used to code sub-blocks of that block.

FIG. 10 discloses how a decision may be made as to whether to further split a smaller block or to encode it using the current transform type. For smaller blocks, a determination may be made at step S1002 if the block is of smallest size. If a positive determination is made, then the block may not be split a decision may be made at step S1010 that the block may be coded directly using the current transform type. If the block was determined to not of the smallest size at step S1002, then a split or no split decision may be made by first calculating the variance for the block at step S1004 and then using the Q function to determine the estimated image quality cost of coding the block directly at step S1006. If the cost of direct coding is determined to be acceptable at step S1008, then a decision that the block may be coded directly may be made at step S1010. Otherwise, a decision that the block may be split may be made at step S1012.

Once an image has been coded, the image may be stored. The stored image may include an image header, transform information. The image header may include information consisting of minimum range block size, maximum range block size, image size, and lean domain pool index to location information. The transform information may include transform family information and adaptive Huffman coded transform parameter information.

A stored image may later be decoded iterating the transforms determined in the coding step using a pyramidal scheme and then post smoothing the image to reduce perceptible line artifacts that result from the coding and decoding process. The post smoothing of the image may be performed by determining a region to filter the image that is one fourth the dimension of the block being filtered in the direction being filtered and then calculating filtered values as weighted averages of proximate pixels along the line perpendicular to the block boundary being filtered where weights may be calculated from a gaussian distribution.

Figure 11:
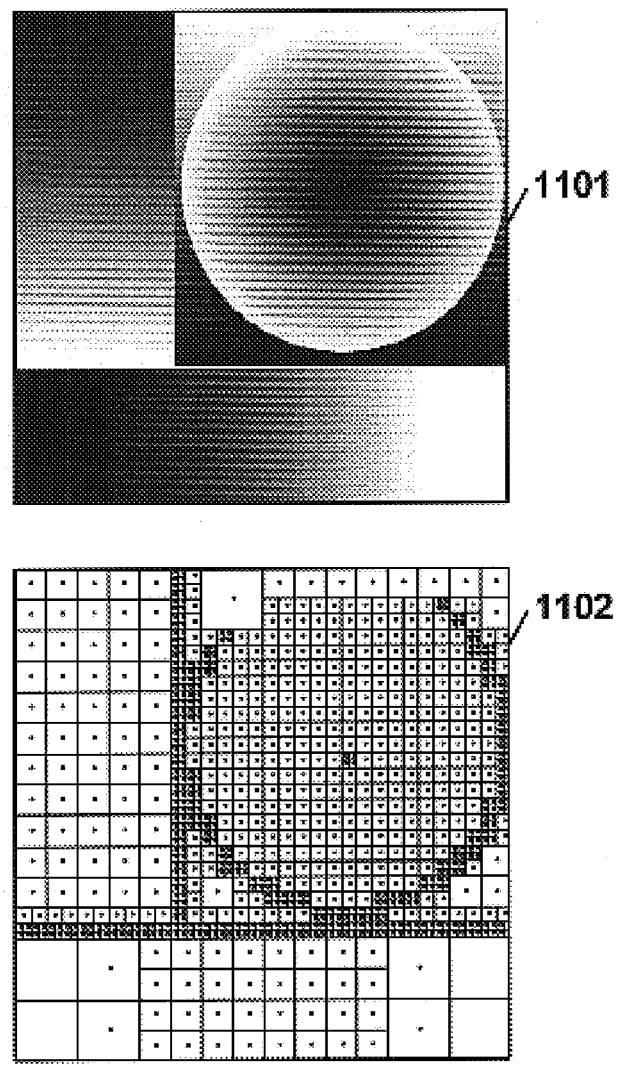
FIG. 11 shows an example of an image processed by the current invention where all regions of the image are characterized by significant slope.
Figure 12:
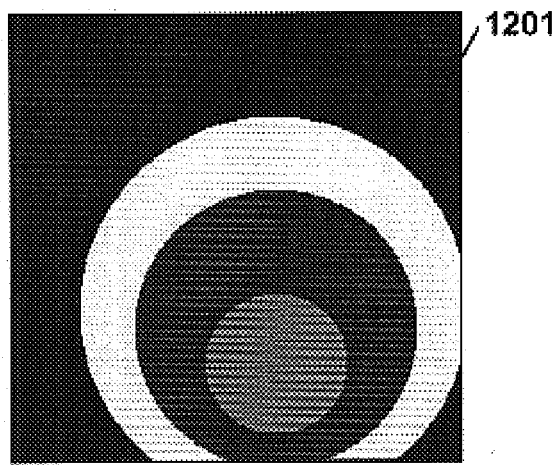
FIG. 12 depicts an example of an image processed by the current invention in which there is no significant slope anywhere in the image.
Figure 12:
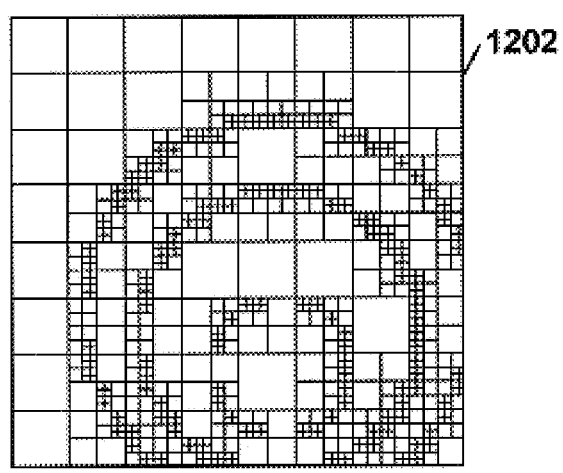

FIGS. 11 and 12 indicate why fractal compression with learning is effective. The Bath transform, because of its linear functional part, performs well for ranges with significant slope characteristics. FIG. 11 shows an example of an image processed by the current invention where all regions of the image are characterized by significant slope. The image in FIG. 11 was partitioned and each range in the partition was assigned a transform using quad-Q-learning. Image 1101 is the original image and image 1102 is the processed image. Notice that 918 range blocks were assigned the Bath transform while only 4 range blocks were assigned the affine transform. FIG. 12 depicts an example of an image processed by the current invention in which there is no significant slope anywhere in the image. Image 1201 is the original image and image 1202 is the processed image. Quad-Q-learning assigned the affine transform to all ranges in that image. In these examples, quad-Q-learning makes reasonable transforms selections.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may use other types of transforms other that Bath and affine transforms. Also, the techniques described could be used for compressing other types of data besides images. It is intended that the scope of the invention be defined by the claims appended hereto.

We claim:

1. A method for coding an image comprising the steps of:
   (a) pre-smoothing said image;
   (b) constructing a lean domain pool;
   (c) classifying domain blocks in the lean domain pool;
   (d) learning a Q-function;
   (e) compressing said image; and
   (f) storing said image.

2. The method according to claim 1, wherein said step of pre-smoothing said image consists of using a low pass filter to remove high frequency content.

3. The method according to claim 1, wherein said step of constructing a lean domain pool further includes the steps of:
   (a) determining the variance of each domain block in a domain pool; and
   (b) eliminating low variance domain blocks from the domain pool;
   thereby reducing the size of said domain pool.

4. The method according to claim 1, wherein said step of classifying domain blocks in the lean domain pool includes assigning classifications to said domain blocks determined by sub block averages and variances.

5. The method according to claim 1, wherein said step of classifying domain blocks in the lean domain pool includes classifying said domain blocks in the lean domain pool according to difference ordinals of block quadrant averages.

6. The method according to claim 1, wherein said step of learning a Q-function further includes the steps of:
   (a) determining how to partition said image into range blocks; and
   (b) determining a fractal transform to use to code a range block based upon local characteristics of the range block.

7. The method according to claim 1, wherein said step of learning a Q-function further includes the steps of:
   (a) learning no-split decisions; and
   (b) learning split decisions.

8. The method according to claim 7, wherein said step of learning no-split decisions further includes the steps of:
   (a) calculating range block attribute vectors;
   (b) calculating quality and compression cost of coding the range block with Bath and affine transform types; and
   (c) updating Q function quality and compression cost estimates for Bath and affine transform types based upon a range block attribute vector calculation.

9. The method according to claim 7, wherein said step of learning split decisions further includes the steps:
   (a) calculating range block attribute vectors and calculating attribute vectors for each quadrant block; and
   (b) updating Q-function quality and compression cost estimates for Bath and affine transform actions based upon range block attribute vector and quadrant attribute vector calculations.

10. The method according to claim 1, wherein said step of compressing said image includes using fractal image compression to compress said image.

11. The method according to claim 1, wherein said step of compressing said image further comprises the steps of:
    (a) using the Q-function to determine an expected quality cost of a Bath no-split decision, an affine no-split decision, a Bath split decision and an affine split decision;
    (b) using the Q-function in the case of split decisions to determine when to stop block splitting;
    (c) using the Q-function compression cost estimate to decide among multiple acceptable decisions made based upon quality cost estimate; and
    (d) matching range blocks to a domain block by classifying the range block and assaying candidates from the lean domain pool that are of the same class.

12. The method according to claim 11, wherein said step of matching range blocks to a domain block further consists of the step of in the case of a Bath transform, classifying the residual of the range block and a functional approximation of the range block instead of classifying the range block.

13. The method according to claim 1, wherein said step of compressing said image includes the steps of:
    (a) calculating expected RMS values from block splitting for a multitude of transforms;
    (b) selecting a transform from said multitude of transforms with the lowest RMS value, if all said multitude of transforms failed to achieve a desired RMS value; and
    (c) selecting a transform from said multitude of transforms that has the minimum bit rate, if all said multitude of transforms achieved a desired RMS value.

14. The method according to claim 1, wherein said step of compressing said image further includes the steps of:
    (a) determining if a block is of smallest size;
    (b) calculating the variance of said block;
    (c) estimating the image quality cost of coding said block directly; and
    (d) if said block is not of a smallest size and if said calculated cost is less than a predetermined cost threshold, splitting said block.

15. The method according to claim 1, wherein said step of storing an image further includes the steps of:
    (a) storing image header information including a minimum range block size, a maximum range block size, an image size, and lean domain pool index to location information; and
    (b) storing transform information including transform family information and adaptive Huffman coded transform parameter information.

16. A method for decoding an image that was coded by a method comprising the steps of: pre-smoothing an image; constructing a lean domain pool; classifying domain blocks in the lean domain pool; learning a Q-function; compressing said image; and storing said image, wherein said method for decoding said image comprises the steps of:
    (a) iterating transforms used in the step of compressing said image using a pyramidal scheme to produce a decoded image; and
    (b) post smoothing said image to reduce perceptible line artifacts.

17. The method according to claim 16, wherein said step of post smoothing the image further includes the steps of:
    (a) determining a region to filter as one fourth the dimension of a block being filtered in the direction being filtered; and
    (b) calculating filtered values as weighted averages of proximate pixels along a line perpendicular to a block boundary being filtered where weights are calculated from a gaussian distribution.

18. The method according to claim 8, wherein said step of updating Q function quality and compression cost estimates for Bath and affine transform types based upon a range block attribute vector calculation includes updating Q function quality and compression cost estimates for Bath and affine transform types based upon a range block attribute vector calculation and candidate block splitting actions.

* * * * *